United States Patent [19]
Hohman

[11] 3,746,951
[45] July 17, 1973

[54] SWITCHING CIRCUIT FOR MOTOR START WINDING

[75] Inventor: William H. Hohman, Bluffton, Ind.

[73] Assignee: Franklin Electric Co., Inc., Bluffton, Ind.

[22] Filed: Nov. 1, 1971

[21] Appl. No.: 194,745

[52] U.S. Cl. .................................. 318/221 E, 318/227
[51] Int. Cl. .......................................... H02p 1/44
[58] Field of Search ..................... 318/221 E, 221 R, 318/227

[56] References Cited
UNITED STATES PATENTS
3,530,348  9/1970  Conner.......................... 318/221 E
3,538,411  11/1970  Knauer et al................... 318/221 E Primary Examiner—Gene Z. Rubinson
Attorney—Axel A. Hofgren, Ronald L. Wanke et al.

[57] ABSTRACT

A thyristor initially couples a start winding of an AC motor to AC power, and then uncouples the start winding when the motor reaches a preselected cut-out speed. A thyristor control circuit, having impedance elements connected across a main winding of the AC motor and connected to the thyristor, monitors motor speed by sensing the relative phase difference between start winding current and applied voltage. Several embodiments are disclosed, including a simplified circuit for generating spaced pulses for controlling the thyristor. Other embodiments include circuits which prevent false triggering of the thyristor in its second and fourth quadrants of operation, and effectively produce equal firing characteristics in its first and third quadrants of operation.

17 Claims, 5 Drawing Figures

Patented July 17, 1973

SWITCHING CIRCUIT FOR MOTOR START WINDING

This invention relates to improved and greatly simplified switching circuits for connecting an AC motor start winding to an AC power source.

This application is an improvement over the motor start winding circuits disclosed in a copending application, Ser. No. 72,675, filed Sept. 16, 1970 by the applicant herein and John A. Whitney and Richard E. Woods, entitled "Switching Circuit For Motor Start Winding," and assigned to the assignee of this application. In said copending application, switching circuits are disclosed which are responsive to the relative phase difference between start winding current and applied voltage. While such circuits are applicable to a wide variety of AC motors and represent a substantial improvement over prior start winding control circuits, a large number of components are required. In accordance with the present invention, several greatly simplified circuits are disclosed which are usable with a number of AC motors.

The improvements disclosed herein include simplified circuits for producing one or plural pulses for controlling a thyristor in accordance with the relative phase difference between the start winding current and the applied voltage. The improvements also include safety means which, in one embodiment, prevent the thyristor from firing in its second and fourth quadrants of operation, while in another embodiment, effectively produced equal sensitivities in the first and third quadrants of operation even though the thyristor has unequal sensitivities. Such safety means prevent an undesirable half-wave operation near cut-out speed, in which one half-cycle of AC power may continue to be gated to the motor state winding for a short time period after the thyristor has blocked the other half-cycle of AC power.

One object of this invention is to provide simplified circuits for controlling the application of AC power to a motor start winding in accordance with the relative phase difference between start winding current and applied voltage.

Another object of this invention is to provide an improved switching circuit for connecting a motor start winding to an AC power source through a thyristor, including safety means to compensate for unequal sensitivities in the four quadrants of operation of the thyristor.

Further objects and features of the invention will be apparent from the following description, and from the drawings, in which.

Figure 1:
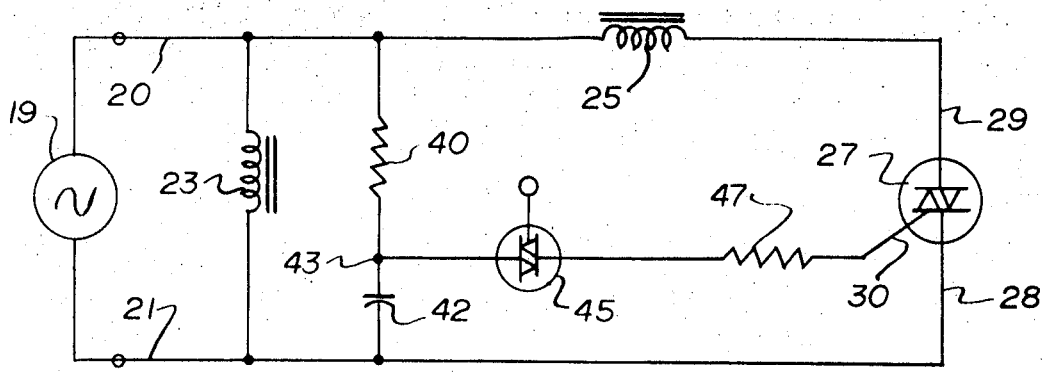
FIG. 1 is a schematic diagram of a novel motor start winding switching circuit which is responsive to the relative phase difference between start winding current and applied voltage.

While illustrative embodiments of the invention are shown in the drawings and will be described in detail herein, the invention is susceptible of embodiment in many different forms and it should be understood that the present disclosure is to be considered as an exemplification of the principles of the invention and is not intended to limit the invention to the embodiments illustrated.

Each thyristor in the drawings is controlled by a circuit which is responsive to the relative phase difference between start winding current and applied voltage. As disclosed in the before identified copending applicaiton, Ser. No. 72,675, a plot of the relative phase angle versus motor speed, between start winding current and applied voltage, is a substantially linear curve which allows precise control of the firing angle of a thyristor. For a further description and illustration of the principle of monitoring motor speed by these sensed quantities, reference should be made to said copending application, Ser. No. 72,675, filed Sept. 16, 1970.

In each of the FIGS. 1-5, a switching circuit is illustrated in which an AC power source 19 is connected through AC power lines 20, 21 with a main motor winding 23, and with a start motor winding 25 through a series connected thyristor 27. Thyristor 27 is preferably a bidirectional triode thyristor, or triac, having a main electrode or terminal 1 identified as 28, a main electrode or terminal 2 identified as 29, and a trigger or gate electrode 30 for controlling the conduction state between the terminals 28 and 29. As is well known, a minimum value of latching current is required at gate 30 to turn on or gate the thyristor into conduction. A holding current of lesser absolute value is required to sustain conduction. Each time the value of current between the terminals 28 and 29 drops below the minimum holding current value, the thyristor reverts to its nonconducting state, thereby uncoupling the start winding 25 from the AC power source unless it is again gated into conduction.

Thyristor 27 can be triggered in any of four operating modes or quadrants of operation. The quadrant designation, as is conventional, refers to the operating quadrants on the principle voltage-current characteristic of the thyristor. The four triggering modes or quadrants for a triac are set forth in the table below.

| OPERATING QUADRANT | GATE 30 TO TERMINAL 28 VOLTAGE | TERMINAL 29 TO TERMINAL 28 VOLTAGE |
|---|---|---|
| I | Positive | Positive |
| II | Negative | Positive |
| III | Negative | Negative |
| IV | Positive | Negative |

The gate-trigger requirements of actual thyristors are different in each operating quadrant. The I and III quadrants are substantially more sensitive than the II and IV quadrants, and hence require substantially smaller gate currents to trigger the triac into conduction. However, the I and III quadrant sensitivities and the II and IV quadrant sensitivities are not exactly equal, though attempts are made to manufacture triacs with equal sensitivities, and thus the required gate current is different for all of the four quadrants. Therefore, a thyristor is gated into conduction at different phase angles in each quadrant of operation. Without compensation, this would cause the state winding 25 to be disconnected for only one-half of a complete AC cycle when the gate current requirements were no longer satisfied for that half cycle, but were still satisfied for the following half cycle which occurs in a different quadrant of operation. Various of the illustrated circuits either partly compensate for, or completely eliminate the undesirable effects of, different sensitivities in the four quadrants of operation of a thyristor.

Turning to FIG. 1, a control circuit for gating triac 27 comprises a pulse generator for generating two pulses for each complete cycle of AC voltage. This generator includes a resistor 40 and a capacitor 42 in series across the AC power lines 20 and 21, and hence is also located in parallel with main winding 23. A junction 43 between resistor 40 and capacitor 42 is connected through a voltage breakdown device 45 and a series connected resistor 47 to the gate 30. Breakdown device 45 may be a silicon bilateral switch or SBS. If higher breakover amplitudes are desired, device 45 may take the form of a DIAC, or other known voltage breakover device having bidirectional characteristics may be utilized.

In operation, when power such as 230 volts AC is applied to the lines 20 and 21, current of one polarity flows through resistor 40 and charges capacitor 42 until the breakdown voltage of device 45 is exceeded, which typically is 10 volts or so for a SBS. The device 45 then turns on and discharges capacitor 42 through resistor 47 into the gate 30. On the next half-wave, current of opposite polarity charges capacitor 42 and creates an opposite polarity gate signal.

The FIG. 1 circuit will properly connect start winding 25 to both positive and negative portions of AC power, in response to the relative phase difference between the start winding current and the applied voltage, for a wide range of motors having the following characteristics. When power is first applied (locked rotor condition), there should be an initial phase shift of 10° to 13° lag for start winding current with respect to applied voltage. By choice of the resistance value of resistor 40, the capacitance value of capacitor 42, and the breakover voltage of device 45, each firing pulse produced by device 45 is chosen to occur at approximately 20° lag with respect to each applied voltage zero crossover. Since the triac is triggered shortly after each current cross-over point, both half cycles of AC power pass through the start winding 25. As the motor accelerates, the phase of the start winding current shifts away from the applied voltage, but it does not reach the firing angle of device 45 until the motor has approached its desired speed.

At cut-out speed, the triac 27 does not turn off, due to a current zero, until after the gate pulse from device 45 has already occurred on one half-wave. The triac therefore does not trigger for the next half-wave. Due to the unequal sensitivities of the triac when operating in the I and III quadrants, the triac will trigger on the succeeding half-wave in which it is slightly more sensitive. This produces an undesirable half-waving condition which will exist until the motor has increased in speed sufficiently to create a condition in which the latching current rating of the triac is not met in either the I or III quadrants. The factors which determine the undesirable amount of half waving are the slope of the start current phase shift curve versus motor speed, the acceleration rate of the motor, and the separation in degrees between the phase shifts, relative to applied voltage, of the start winding current and the sum voltage when the triac is rendered nonconductive. While the FIG. 1 circuit allows half-waving, this condition is tolerable for many motor applications of a less critical nature, especially where cost is a major consideration.

The circuit of FIG. 1 has worked satisfactorily with submersible type motors in the ¼ through 1-½ horsepower range, having a 230 volt rating. The purpose of resistor 47 is to allow use of a triac having a low latching current. The resistance value of resistor 47 is selected so that the required trigger current to the triac gate is not met in the II and IV quadrants of operation, but is met in the I and III quadrants. The resistor 47 can be eliminated if a triac is used which has a high latching current.

Figure 2:
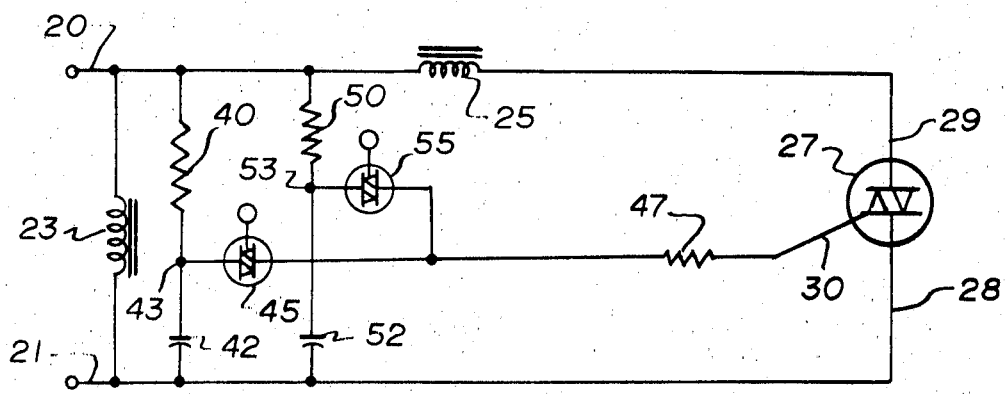
FIG. 2 is a schematic diagram of a circuit, similar to FIG. 1, for generating spaced pulses for controlling a switching thyristor.

In FIG. 2, the circuit of FIG. 1 has been modified so as to achieve full starting torque while extending the speed at which the start winding 25 will be cut-out. A second pulse generating circuit, having a different time constant than the first pulse generating circuit, is formed by a series resistor 50 and capacitor 52 in parallel across the AC power lines 20 and 21. A junction 53 between resistor 50 and capacitor 52 is coupled through a breakover device 55, similar to device 45, to the resistor 47 which connects with the gate 30.

The value of resistor 50, capacitor 52 and/or the breakover voltage of device 55 is altered from the corresponding value for the resistor 40, capacitor 42 and/or the breakover voltage for device 45 so as to generate a pulse spaced from the pulse generated by the first circuit including device 45. The second pulse extends the range at which the triac 27 will be gated into conduction, thereby causing the start winding 25 to remain in circuit for higher speeds, when desired. The pair of pulses produced by the FIG. 2 circuit essentially simulates the effect of a pulse burst. This circuit may be used in place of the pulse burst generator disclosed in the before identified copending application, Ser. No. 72,675, to produce a generally similar operation with a considerable reduction in components and very low power consumption.

The circuits of FIGS. 1 and 2 take advantage of the unsymmetry of the gate signal requirements for a triac, namely, that most triacs are made sensitive in the I and III quadrants and not sensitive in the II and IV quadrants of operation. For certain triacs, however, the difference in sensitivity may not be great enough to insure proper operation in a particular motor application. In this event, the circuit of FIG. 3 may be used.

Figure 3:
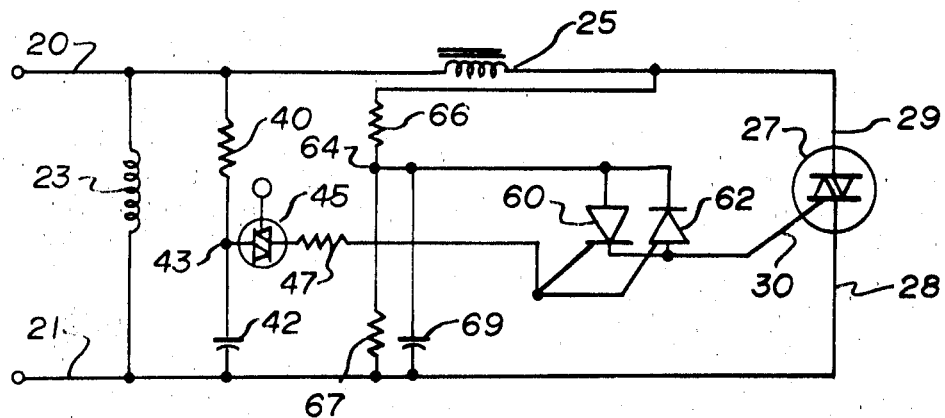
FIG. 3 is a schematic diagram of a circuit having safety means for insuring that the thyristor is fired only during its first and third quadrants of operation.

In FIG. 3, an additional pair of thyristors 60 and 62, such as SCRs, insure that thyristor 27 can only be fired in its I and III quadrants. The SCRs 60 and 62 are connected back-to-back and in parallel, with the cathode of SCR 60 and the anode of SCR 62 being connected to the gate 30, and the anode of SCR 60 and the cathode of SCR 62 being connected to a junction 64 in an electrical path across the triac 27. The path includes a first resistor 66 in series with a second resistor 67, the junction therebetween forming junction 64. A capacitor 69 is in shunt with resistor 67. During quadrant I operation of triac 27, SCR 60 is biased so as to conduct when SBS 45 is triggered into conduction and generates a first gate signal leaving a phase fixed with respect to applied voltage. During quadrant III operation, SCR 62 is relatively biased so as to conduct when SBS 45 is again triggered into conduction on the opposite half-wave, generating a second gate signal having a similar fixed phase with respect to the zero crossing of applied voltage. The illustrated circuit prevents either of the two gate signals or pulses from being coupled to gate 30 during quadrant II and IV operation.

Figure 4:
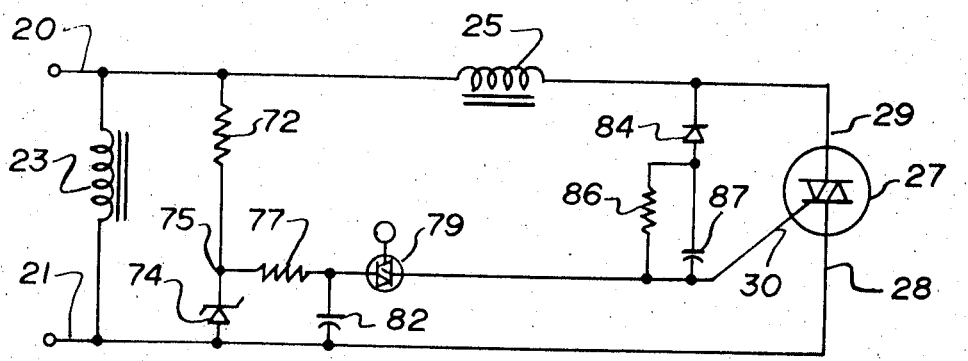
FIG. 4 is a schematic diagram of a circuit having safety means for insuring that the thyristor is triggered the same as if it has equal sensitivities in its first and third quadrants of operation.

In FIG. 4, a modified circuit is illustrated which prevents an undesirable "half-wave" operation which otherwise would occur because practical triacs will have unequal sensitivities in their I and III quadrants of operation. A resistor 72 and a Zener diode 74 are connected in series across the AC source. A junction 75 between the resistor 72 and Zener diode 74 is coupled through a resistor 77 and a SBS 79 to the gate 30. A capacitor 82 is connected so that the series combination of resistor 77 and the capacitor 82 shunts the Zener diode 74. An additional triggering network consists of a diode 84 in series with the parallel combination of a resistor 86 and a capacitor 87. The network is connected between the gate 30 and the terminal 29 of the triac 27.

In operation, capacitor 82 charges when line 20 goes positive with respect to line 21, due to current flow through resistor 72. When the breakdown potential of the SBS 79 is exceeded, such as 8 volts, a positive gate pulse is coupled to gate 30. The time of occurrence of this pulse with respect to the zero crossing of the applied voltage waveform is determined by the time constant of resistors 72 and 77 and capacitor 82. When line 20 goes negative with respect to line 21, no pulse is generated because the Zener diode 74 is connected in a forward direction which shunts the charging current around capacitor 82. The use of a Zener diode, rather than an ordinary diode, provides better line voltage compensation for the switching circuit, especially when using an AC motor having a 115 volt rating.

Each positive half-wave with reference to AC line 20 generates a triggering pulse which gates on the triac 27. As the start winding current nears the end of that half cycle and goes to zero, the triac 27 is turned off at which time the voltage across the triac goes to a sum voltage value, namely the vector sum of applied line voltage and induced start winding voltage. Of course, the sum voltage is present across the triac 27 only when the triac is in its nonconducting mode. As the triac goes nonconductive, a sharp rate of rise of voltage is experienced as the sum voltage appears across the triac. This rapid rate of rise of voltage is fed back to the gate through diode 84, resistor 86 and capacitor 87, and forms a second gate pulse for triggering the triac 27 to pass a negative half-cycle of applied voltage. The capacitance value of capacitor 87 is selected to produce a low impedance current path to this high frequency sum signal, thus turning on the triac for the negative half-wave. Resistor 86 is placed in shunt across capacitor 87 in order to discharge the capacitor after its charge cycle. The triac will continue to be enabled twice for each whole cycle until the start winding current zero crossing occurs after the triggering pulse from SBS 79.

When the triac 27 is not turned on for the positive half-wave, then it cannot be turned on for the negative half-wave because there is no sharp rise of voltage as occurs when the triac changes state. Therefore the half-waveing effect is eliminated. Although the sensitivities of the triac 27 in its I and III quadrants have not been altered, the circuit effectively makes the sensitivities equal. The technique of FIG. 4 can be used with a single pulse generator circuit, as illustrated, or any number of pulse generators which form a pulse burst, such as shown in FIG. 2.

Figure 5:
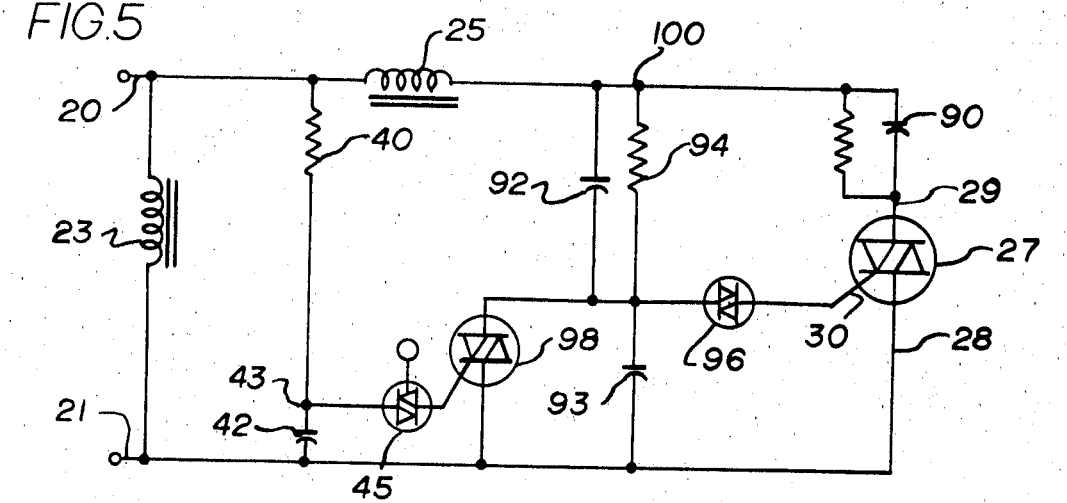
FIG. 5 is a schematic diagram of a circuit usable with an AC motor having a start capacitor.

When a start capacitor is required for an AC motor, the circuit of FIG. 5 may be utilized. A start capacitor 90 is connected in series between terminal 29 and start winding 25. A relaxation oscillator is formed by a pair of capacitors 92 and 93, a resistor 94, a voltage breakdown device as a DIAC 96, and a second triac 98. When power is supplied to lines 20 and 21, a sum voltage equal to the sum of applied voltage and start winding induced voltage appears at a junction 100 between start winding 25 and start capacitor 90. This voltage causes the relaxation oscillator to become excited and pass a gate pulse to gate 30.

As triac 27 is enabled, current flows through the start winding 25 and start capacitor 90, causing a voltage waveform to appear across the start capacitor 90 with respect to line 21. This voltage waveform lags the voltage sum, which in turn lags the applied voltage. Unlike the previous embodiments, the start current leads the applied voltage when the motor first begins to rotate, due to the effect of the start capacitor 90. After each zero crossing of the applied voltage, resistor 40 starts to charge capacitor 42 until the breakdown voltage of the SBS is reached. At this time, the SBS 45 latches for the remainder of the half-cycle, firing the second triac 98 which shunts the relaxation oscillator to line 21, which may be considered reference ground. When the start current goes to zero, triac 27 turns off and causes the voltage at junction 100 to go to the valve of the sum voltage. This step change causes capacitor 92 to turn off the second triac 98, thereby allowing the relaxation oscillator to become excited again, and thus turn on triac 27. The above described cycle of operation then repeats as the motor is accelerating.

As the motor reaches cut-out speed, which is determined by the pair of time constants of resistor 40 and capacitor 42, and resistor 94 and capacitor 93, the sum of the induced and applied voltage will be close to its zero crossing. This condition causes the second triac 98 to be turned back on before the oscillator is re-excited, thus preventing the triac 27 from again being gated into conduction. Thus the start winding 25 and series start capacitor 90 are removed from the circuit when the motor reaches the selected cut-out speed.

Depending on the characteristics of the particular AC motor utilized, various of the circuits illustrated in the drawings may be combined to produce the desired motor operation. Other modifications will be apparent to those skilled in the art.

I claim:

1. In an AC motor without a start capacitor and having a main winding and a start winding each connectable with an AC source of applied voltage, a switching circuit for controlling the application of power to the start winding, comprising:
   main winding circuit means for connecting said main winding in parallel with said AC source;
   thyristor means having power terminals exhibiting conductive and nonconductive states therebetween under control of a gate signal at a gate terminal;
   start winding circuit means for connecting said start winding and said power terminals in series across said AC source to cause the phase of start current through the thyristor means and the start winding to lag the phase of the applied voltage, the phase lag increasing with motor speed;
   resistive means;
   capacitive means;

first control means for connecting said resistive means and said capacitive means across said AC source, the connection including a junction; and second control means connecting said junction to said gate terminal for developing said gate signal at a predetermined firing angle with respect to the phase of the applied voltage, said predetermined firing angle approximately coinciding with the phase lag of said start current when said AC motor reaches a desired start winding cut-out speed.

2. The switching circuit of claim 1 wherein said second control means includes voltage breakdown means in series between said junction and said gate terminal, said voltage breakdown means having a breakdown potential substantially less than the magnitude of voltage from said AC source to cause a charge voltage across said capacitor means to trigger said voltage breakdown means at least once for each cycle of AC voltage.

3. The switching circuit of claim 2 wherein said second control means further includes resistive means in series with said voltage breakdown means.

4. The switching circuit of claim 2 including third control means comprising a second resistive means and a second capacitive means in series across said AC source, said third control means including a junction between the second resistive and second capacitive means, the time constant of said third control means being different than the time constant of said first control means, and said second control means includes additional means connected with the junction in said third control means to pass to said thyristor means a pair of spaced triggering pulses generated by said first and third control means.

5. The switching circuit of claim 4 wherein said additional means comprises a second voltage breakdown means connected in series between the junction of said third control means and said gate terminal.

6. The switching circuit of claim 1 in which said thyristor means has four quadrants of operation defined by four different combinations of positive and negative voltages at said power terminals and said gate terminals, said second control means includes safety means for enabling said thyristor means only for two of said four quadrants of operation.

7. The switching circuit of claim 6 wherein said safety means includes additional thyristor means, impedance means connected in series across said first named thyristor means, and means connecting said additional thyristor means to said impedance means to trigger the additional thyristor means in said two quadrants of operation.

8. In a capacitor start AC motor having a main winding and a start winding each connectable with an AC source of applied voltage, a switching circuit for controlling the application of power to the start winding, comprising:

main winding circuit means for connecting said main winding in parallel with said AC source;

thyristor means having power terminals exhibiting conductive and nonconductive states therebetween under control of a gate signal at a gate terminal;

a start capacitor;

start winding circuit means for connecting said start winding, said power terminals and said start capacitor in series across said AC source to cause the phase of start current to lead the applied voltage;

resistive means;

capacitive means;

first control means for connecting said resistive means and said capacitive means across said AC source, the connection including a junction; and second control means connecting said junction to said gate terminal through relaxation oscillator means for triggering said thyristor means in response to the relative phase difference between the phase of said start winding current and the phase of said voltage from said AC source.

9. The switching circuit of claim 8 wherein said relaxation oscillator means includes impedance means connected to a junction between said start capacitor and said start winding, voltage breakdown means connected between said impedance means and said gate terminal, and shunt thyristor means connected between said first control means and said series connected impedance means and voltage breakdown means for controlling the energization of said relaxation oscillator means.

10. In an AC motor having a main winding and a start winding each connectable with an AC source of alternating voltage having positive and negative portions, a switching circuit for controlling the application of power to the start winding, comprising:

main winding circuit means for connecting said main winding in parallel with said AC source;

a bidirectional thyristor device having a pair of power terminals for passing both positive and negative portions of alternating voltage when triggered into a conductive state under control of a gate signal at a gate terminal, said bidirectional thyristor device being triggered into said conductive state for any of four combinations of positive and negative signals at said gate terminals and said power terminal, said four combinations defining four quadrants of operation each having a different gate signal sensitivity;

start winding circuit means for connecting said start winding and said pair of power terminals in series across said AC source to gate both positive and negative portions of alternating voltage to said start winding through said bidirectional thyristor device; and control means for generating a plurality of gate signals for each cycle of alternating voltage when said AC motor is below a cut-out speed, one of said plurality of gate signals being capable of triggering said bidirectional thyristor device to pass a positive portion of said alternating voltage and another of said plurality of gate signals being capable of triggering said bidirectional thyristor device to pass a negative portion of said alternating voltage, including gate means for blocking gate signals occurring during two of said four quadrants, thereby preventing said bidirectional thyristor device from being triggered into conduction during either of said two quadrants.

11. The switching circuit of claim 10 wherein said gate means comprises controllable conduction means, said control means includes electrical path means in parallel with said AC source for developing two trigger signals for each cycle, each trigger signal having a phase fixed with respect to the phase of alternating voltage, and network means connecting said electrical path means to said controllable conduction means to control the state of said controllable conduction means in response to said two trigger signals.

12. The switching circuit of claim 11 wherein said electrical path means comprises resistive means and capacitive means connected in series across said AC source, the junction between said resistance means and capacitance means being coupled to a voltage breakdown device connected to said network means.

13. In an AC motor having a main winding and start winding each connectable with an AC source of alternating voltage having positive and negative portions, a switching circuit for controlling the application of power to the start winding, comprising:

main winding circuit means for connecting said main winding in parallel with said AC source;
  a bidirectional thyristor device having a pair of power terminals for passing both positive and negative portions of alternating voltage when triggered into a conductive state under control of a gate signal at a gate terminal, said bidirectional thyristor device being triggered into said conductive state for any of four combinations of positive and negative signals at said gate terminal and said power terminal, said four combinations defining four quadrants of operation each having a different gate signal sensitivity;
  start winding circuit means for connecting said start winding and said pair of power terminals in series across said AC source to gate both positive and negative portions of alternating voltage to said start winding through said bidirectional thyristor device; and
  control means for generating a plurality of gate signals for each cycle of alternating voltage when said AC motor is below a cut-out speed, one of said plurality of gate signals being capable of triggering said bidirectional thyristor device to pass a positive portion of said alternating voltage and another of said plurality of gate signals being capable of triggering said bidirectional thyristor device to pass a negative portion of said alternating voltage, including safety means for causing said one gate signal and said another gate signal to effectively produce identical operation of said bidirectional thyristor device for two quadrants of said four quadrants of operation, said safety means comprises first trigger means responsive to only one of said positive and negative portions for generating a first gate signal which triggers said bidirectional thyristor device into conduction to pass said one portion, and second trigger means responsive to prior generation of the first gate signal for generating a second gate signal which triggers said bidirectional thyristor device into conduction to pass the remaining of said positive and negative portions of alternating voltage.

14. The switching circuit of claim 13 wherein said second trigger means is responsive to a voltage which appears in said start winding circuit means when said bidirectional thyristor means changes from a conductive to a nonconductive state to generate said second gate signal, whereby the change from a conductive to a nonconductive state indicates the prior generation of the first gate signal.

15. The switching circuit of claim 14 wherein said second trigger means is coupled to a junction between the start winding and said power terminals of said bidirectional thyristor device, whereby said voltage corresponds to the sum of the alternating voltage from said AC source and a voltage induced in said start winding.

16. The switching circuit of claim 14 wherein said first trigger means comprises electrical path means connected in parallel with said AC source, said electrical path means including phase shift means for causing said first gate signal to lag the phase of alternating voltage from said AC source.

17. The switching circuit of claim 16 wherein said electrical path means includes capacitive means, and diode means for charging said capacitive means with only one of said positive and negative portions of alternating voltage, and said phase shift means includes a voltage breakdown device coupled to said capacitive means for generating said first gate signal when the voltage across said capacitive means exceeds the breakdown potential of said voltage breakdown device.

* * * * *